(12) United States Patent
Roston et al.

(10) Patent No.: US 11,338,419 B1
(45) Date of Patent: May 24, 2022

(54) FAUCET CARTRIDGE REMOVAL TOOL AND METHOD OF OPERATION

(71) Applicants: Edward Roston, North Palm Beach, FL (US); Edward Roston, Jr., North Palm Beach, FL (US)

(72) Inventors: Edward Roston, North Palm Beach, FL (US); Edward Roston, Jr., North Palm Beach, FL (US)

(*) Notice: Subject to any disclaimer, the term of this patent is extended or adjusted under 35 U.S.C. 154(b) by 0 days.

(21) Appl. No.: 17/380,978

(22) Filed: Jul. 20, 2021

(51) Int. Cl.
*B25B 27/24* (2006.01)

(52) U.S. Cl.
CPC ........ *B25B 27/24* (2013.01); *F16K 2200/501* (2021.08)

(58) Field of Classification Search
CPC .............................. B25B 27/24; F16K 220/501
USPC ..................................................... 29/890.141
See application file for complete search history.

(56) References Cited

U.S. PATENT DOCUMENTS

| 4,079,494 A | 3/1978 | Sutton |
| 5,054,179 A | 10/1991 | Rini |
| 5,119,556 A | 6/1992 | Hseu |
| 5,915,741 A | 6/1999 | Parker |
| 6,929,024 B1 | 8/2005 | Rucker |
| 7,987,571 B2 | 8/2011 | English |
| D875,494 S | 2/2020 | Widner et al. |
| 10,792,796 B2 | 10/2020 | Wilson |

*Primary Examiner* — Lee D Wilson
*Assistant Examiner* — Aaron R McConnell
(74) *Attorney, Agent, or Firm* — Mark Terry

(57) ABSTRACT

A faucet cartridge removal tool includes a cylindrical sleeve having an interior diameter configured such that a pipe holding a faucet cartridge fits within the cylindrical sleeve, a length configured such that a distal end of the cylindrical sleeve contacts a base of the pipe holding the faucet cartridge; a tubular extractor rod that extends through the cylindrical sleeve, the rod having a threaded exterior surface configured to thread through the threaded orifice of the cylindrical sleeve, a threaded interior surface of the rod, and a notch at a distal end, the notch configured to accept a faucet cartridge; a locking bolt that extends through the extractor rod, the bolt having a threaded exterior surface configured to thread through the threaded interior surface of the rod, wherein the threaded exterior surface at a distal end of the rod is configured to thread through a threaded orifice in the faucet cartridge.

19 Claims, 5 Drawing Sheets

FAUCET CARTRIDGE REMOVAL TOOL AND METHOD OF OPERATION

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The claimed subject matter relates to plumbing tools, and more specifically relates to plumbing tools for removing faucet cartridges.

BACKGROUND

The following background information presents examples of specific aspects of the prior art (e.g., without limitation, approaches, facts, or common wisdom) that, while expected to be helpful to further educate the reader as to additional aspects of the prior art, is not to be construed as limiting the claimed embodiments, or any embodiments thereof, to anything stated or implied therein or inferred thereupon.

A faucet cartridge is a device within a faucet that controls the flow of water. The function of a cartridge is to turn the water on and off, and to control the quantity of water flowing through a faucet. Many faucet cartridges are integrated within valves, which provide the structural support from within which the cartridge can perform its water regulation function. A cartridge is connected to a handle and resides within a valve, which resides within the faucet. When you turn the handle of a faucet, the handle turns the cartridge within the valve to control the flow of water out of the spout of the faucet.

A cartridge is a replaceable part that may last years but eventually needs to be changed. Over time, faucet cartridges experience wear and tear, corrosion, and become coated with mineral deposits. This results in improper functioning such as water leaks and difficulty in turning the handles. One of the problems associated with removing old or malfunctioning faucet cartridges is that they may get impacted in place and require a large amount of force to remove. When said large amount of force is removed, it may damage the valve, the pipes attached to the valve, the masonry or tiles surrounding the valve, as well as the plumber himself. This can cause additional damage to the surrounding areas which must then be fixed, which is time consuming and costly.

Conventional cartridge removal tools exist, but they are unwieldy and difficult to use. The current cartridge removal tools do not have the ability to remove impacted or stuck cartridges easily without causing damage to the surrounding areas or to the plumber himself. Conventional cartridge removal tools lack the usability and ease necessary for such a tool.

As a result of the previously recognized issues, a need exists for more efficient methods and systems for removing faucet cartridges without causing damage to the valve, the pipes attached to the valve, the masonry or tiles surrounding the valve, or the plumber himself.

BRIEF SUMMARY

Illustrative embodiments of the disclosure are generally directed to a faucet cartridge removal tool and method of operation. The tool comprises (a) a cylindrical sleeve having: 1) an interior diameter configured such that a pipe holding a faucet cartridge fits within the cylindrical sleeve; 2) a length configured such that a distal end of the cylindrical sleeve contacts a base of the pipe holding the faucet cartridge; 3) a hexagonal shape at a proximal end; and 4) a threaded orifice at the proximal end; (b) a tubular extractor rod that extends through the cylindrical sleeve, the rod having: 1) a threaded exterior surface configured to thread through the threaded orifice of the cylindrical sleeve; 2) a bore at a proximal end of the rod, the bore arranged perpendicular to a longitudinal axis of the rod; 3) a threaded interior surface of the rod at a distal end of the rod; and 4) a notch at a distal end of the rod, the notch configured to accept a proximal end of the faucet cartridge; (c) a locking bolt that extends through the extractor rod, the bolt having: 1) a threaded exterior surface configured to thread through the threaded interior surface of the rod at a distal end of the rod, wherein the threaded exterior surface at a distal end of the rod is configured to thread through a threaded orifice in the proximal end of the faucet cartridge; and 2) a hexagonal shape at a proximal end; and (d) a cross bar that fits securely within the bore at a proximal end of the rod.

Additional aspects of the claimed subject matter will be set forth in part in the description which follows, and in part will be obvious from the description, or may be learned by practice of the claimed subject matter. The aspects of the claimed subject matter will be realized and attained by means of the elements and combinations particularly pointed out in the appended claims. It is to be understood that both the foregoing general description and the following detailed description are exemplary and explanatory only and are not restrictive of the disclosed subject matter, as claimed.

BRIEF DESCRIPTION OF THE DRAWINGS

The accompanying drawings, which are incorporated in and constitute part of this specification, illustrate embodiments of the claimed subject matter and together with the description, serve to explain the principles of the claimed subject matter. The embodiments illustrated herein are presently preferred, it being understood, however, that the claimed subject matter is not limited to the precise arrangements and instrumentalities shown, wherein:

Like reference numerals refer to like parts throughout the various views of the drawings.

DETAILED DESCRIPTION

Figure 1:
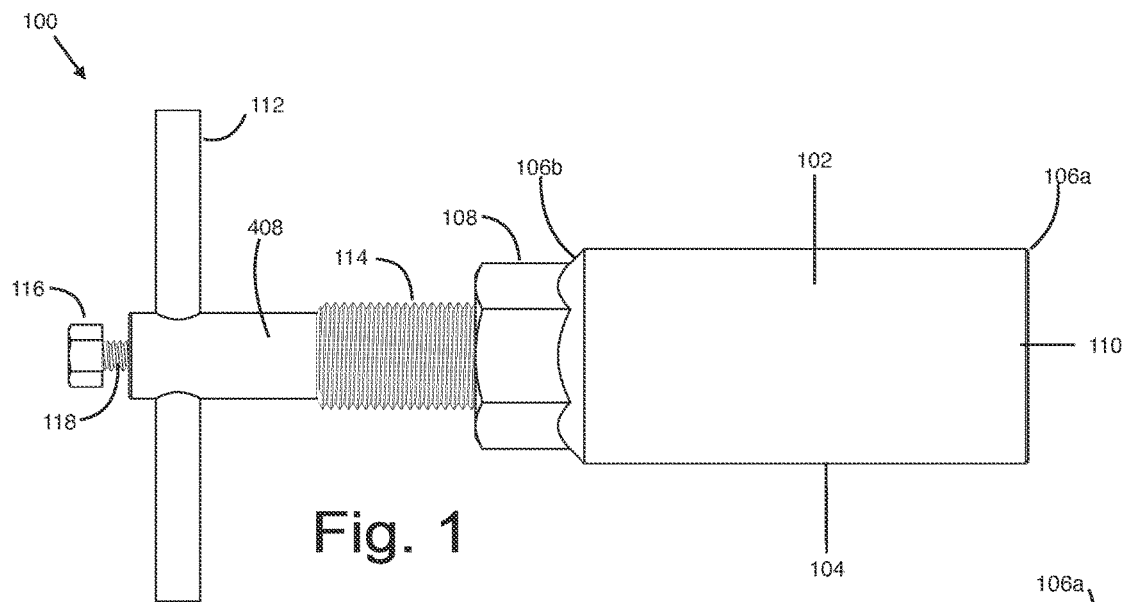
FIG. 1 illustrates a side view of the faucet cartridge removal tool, in accordance with an exemplary embodiment.

The disclosed embodiments improve upon the issues identified within the prior art by providing a tool that allows for quick and easy removal of faucet cartridges that may be impacted in place and require a large amount of force to remove. Additionally, the claimed embodiments allow for efficient and speedy replacement, maintenance and/or upkeep of faucet cartridges. The disclosed embodiments also facilitate an easier and less arduous installation and maintenance process. When faucet cartridges have become impacted in place and require a large amount of force to remove, the claimed embodiments may be used, due to the ease with which the claimed tool may be used to remove the faucet cartridge. The above-noted advantages increase the usability and user-friendliness of the claimed embodiments in such plumbing situations. The disclosed embodiments provide a convenient means of removing faucet cartridges that may be impacted in place and require a large amount of force to remove without causing damage to the valve, the pipes attached to the valve, the masonry or tiles surrounding the valve, as well as the plumber himself. This reduces or eliminates the possibility that additional damage to the surrounding areas is caused, which must then be fixed, thereby saving time and money.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the claimed embodiments as oriented in the figures. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A faucet cartridge removal tool 100 and method 1100 of operation is referenced in FIGS. 1-11. The faucet cartridge removal tool 100, hereafter "tool 100," is configured to threadably advance into a pipe 500, and enable one-handed removal or installation of a faucet cartridge 502 therefrom. The tool 100 has unique dimensions that facilitate alignment and introduction onto and into the pipe 500. The tool 100 also provides components that align with an opening in the pipe 500, and enable simple threaded advancement and withdrawal through the pipe 500 for extracting or installing the faucet cartridge 502. The tool 100 utilizes unique coupling mechanisms, such as a notch 304 and a threaded exterior surface 412, that couple to the faucet cartridge 502, so as to enable facilitated insertion and withdrawal thereof.

As referenced in FIG. 1, the tool 100 comprises a cylindrical sleeve 102 that houses other components for alignment with the pipe 500 holding the faucet cartridge 502. The tool 100 also comprises a tubular extractor rod 400 that is independently rotatable inside the cylindrical sleeve 102 to threadably advance towards the faucet cartridge 502, terminating at a notch 304 that snugly engages a proximal end 506 of the faucet cartridge 502. The tool 100 also comprises a locking bolt 410 that is independently rotatable inside the extractor rod 400 to threadably advance towards the faucet cartridge, terminating at a threaded exterior surface 412 that engages and threads through a threaded orifice 508 in the proximal end 506 of the faucet cartridge 502, so as to couple to, and remove, the faucet cartridge 502 from the pipe 500.

Note that pipe 500 extends outwards in a direction collinear with and/or parallel with the main longitudinal axis of the cylindrical sleeve 102 of the tool 100. Note also that pipe 500 extends from a T-junction or cross-junction of pipes that are perpendicular to the pipe 500. Where the pipe 500 meets the T-junction or cross-junction of pipes is referred to as the base 504 of the pipe 500. The entirety of the pipe 500, as well as the T-junction or cross-junction of pipes is referred to as a valve. Where the pipe 500 meets the T-junction or cross-junction of pipes may also be referred to as the valve body where the screws for an escutcheon plate may connect.

Those skilled in the art will recognize that most faucets that have two handles are cartridge-style faucets. Each faucet handle (hot and cold) has its own cartridge, which is simply a valve that turns with the handle to control the flow of water into the faucet spout. Such faucet cartridges eventually require replacement. However, extracting a faucet cartridge from the pipe, beneath the faucet handle can be difficult due to its snug fit in the pipe, and the buildup of debris therearound. The present disclosure overcomes these difficulties with unique faucet cartridge extraction and installation mechanisms, as described below.

Figure 2:
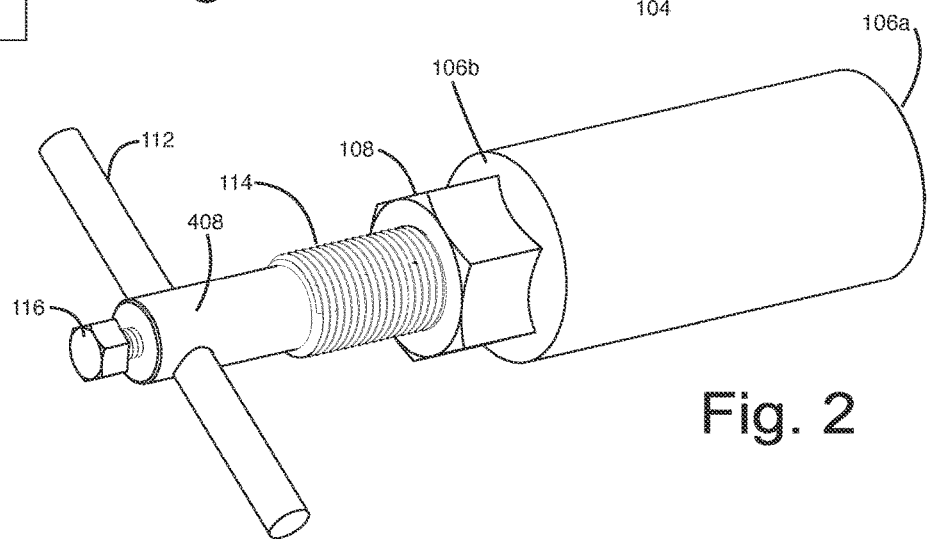
FIG. 2 illustrates a side perspective view of the faucet cartridge removal tool, in accordance with an exemplary embodiment.

As illustrated in FIG. 2, the tool 100 comprises a cylindrical sleeve 102 that is shaped and dimensioned to form an exterior surface to house an extractor rod 400 and a locking bolt 410; align the extractor rod 400 and the locking bolt 410 with the faucet cartridge; and create a pre-set distance between the extractor rod 400 and the locking bolt 410, and the faucet cartridge 502. In some embodiments, the cylindrical sleeve 102 provides a point of reference, and an alignment means, to the pipe 500 in which the faucet cartridge 502 resides. Thus, the cylindrical sleeve 102 defines an interior diameter 110 that is sized, such that a pipe 500 holding the faucet cartridge 502, fits within the cylindrical sleeve 102. This interior diameter 110 may be between 1 and 2 inches, depending on the size of the pipe.

In other embodiments, the cylindrical sleeve 102 defines a length 104. In one non-limiting embodiment, the length 104 is about 4½". However, both the interior diameter 110 and length 104 are scalable. Nonetheless, the length 104 is significant, since length is determinative of the maximum extension and retraction by the extractor rod 400 and the locking bolt 410 housed inside the cylindrical sleeve 102. This relative length relationship is a novel use of spacing that optimizes access to the faucet cartridge 502, as described below. It is significant to note that the tool 100 is scalable, and thereby multiple tools can be carried to accommodate different sizes and styles of pipes and faucet cartridges.

Figure 3:
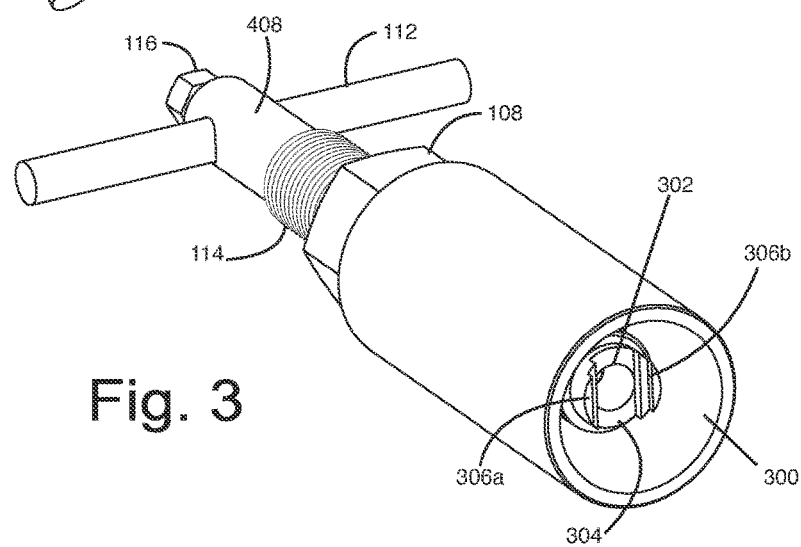
FIG. 3 illustrates a front perspective view of the faucet cartridge removal tool, in accordance with an exemplary embodiment.
Figure 7:
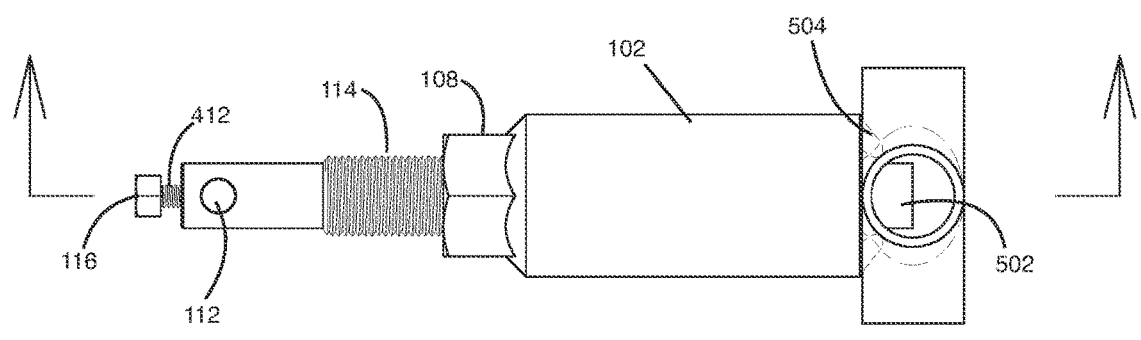
FIG. 7 illustrates a side view of the faucet cartridge removal tool applied to the valve to remove the faucet cartridge, in accordance with an exemplary embodiment.

Looking now at FIG. 3, the cylindrical sleeve 102 has a proximal end 106b oriented towards the user, and a distal end 106a that orients towards the faucet cartridge 502. Thus, the distal end 106a of the cylindrical sleeve 102 is sufficiently sized to securely abut a base 504 of the pipe 500 that holds the faucet cartridge 502 (see FIG. 7). Note that FIG. 7 shows that the interior volume of the cylindrical sleeve 102 is sized and shaped such that the entire section of the pipe 500 that emanates from the T-junction is located entirely within, and completely surrounded by, the cylindrical sleeve. Note also that distal end 106a is contacting, touching or abutting the base 504 of pipe 500, which provides the tool 100 with a surface from which to push, as described in more detail below. In some embodiments, the cylindrical sleeve 102 has a hexagonal shape 108 disposed at the proximal end 106b. The hexagonal shape 108 enables a wrench (such as an adjustable crescent wrench) to grip the cylindrical sleeve 102 to remain stationary. This allows the extractor rod 400 and the locking bolt 410 to rotate independently from inside the cylindrical sleeve 102.

Also illustrated is a threaded orifice 300 that forms at the proximal end 106b of the cylindrical sleeve 102. The threaded orifice 300 enables threaded engagement with the extractor rod 400, described below. When engaged in this manner, the extractor rod 400 remains aligned with the cylindrical sleeve 102, which is itself abutted against and aligned with the pipe 500 containing the faucet cartridge 502. Suitable materials for the cylindrical sleeve 102 may include, without limitation, carbon steel, high-speed steel, cast alloys, tungsten carbide, aluminum, and metal alloys.

Figure 4:
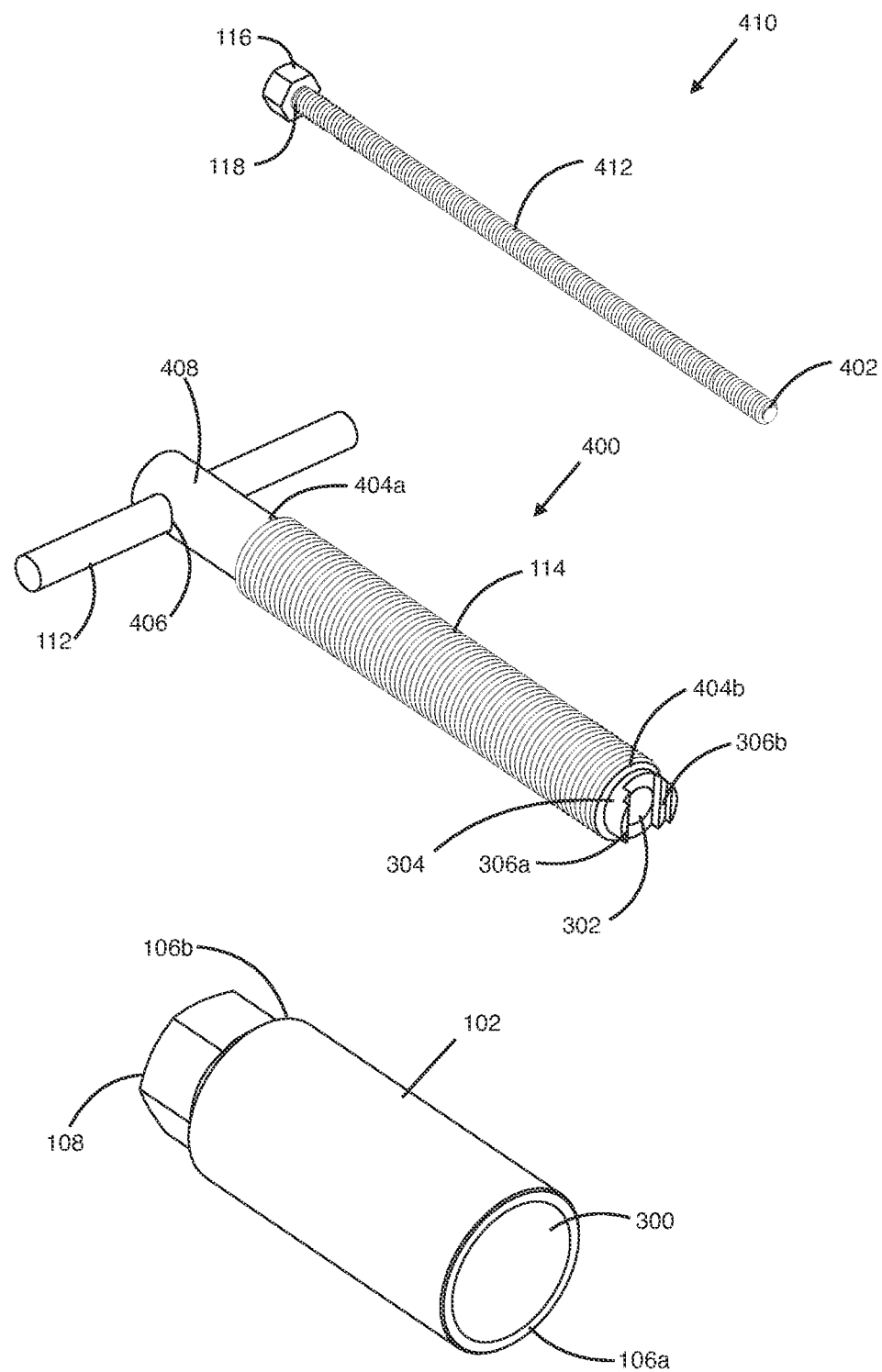
FIG. 4 illustrates an exploded view of the faucet cartridge removal tool, in accordance with an exemplary embodiment.

Turning now to FIG. 4, the tool 100 also includes a tubular extractor rod 400 that extends through the cylindrical sleeve 102 in a colinear relationship. The extractor rod 400 has a proximal end 404a oriented towards the user, and an opposing distal end 404b that orients towards the faucet cartridge 502. In some embodiments, the extractor rod 400 is longer than the cylindrical sleeve 102, which allows the distal end 404b of the extractor rod 400 to extend past the distal end 106a of the cylindrical sleeve 102, and into the pipe 500 for engagement with the faucet cartridge 502. In one non-limiting embodiment, the extractor rod 400 has a length of about 6¾".

In some embodiments, the distal end 404b of the extractor rod 400 defines a notch 304 that is configured to accept a proximal end 506 of the faucet cartridge 502. The notch 304 is sized and dimensioned to detachably mate with a corresponding protrusion, ridge, or irregular shape at the proximal end 506 of the faucet cartridge 502, forming a snug relationship therebetween. This notch-coupling relationship serves to retain the extractor rod 400, and thereby the tool 100, in alignment with the faucet cartridge 502. In one possible embodiment, the notch 304 defines a pair of ridged flanges 306a, 306b that provide texture to prevent slippage and strengthen the connection between the distal end 404b of the extractor rod 400 and the proximal end 506 of the faucet cartridge 502.

Figure 5:
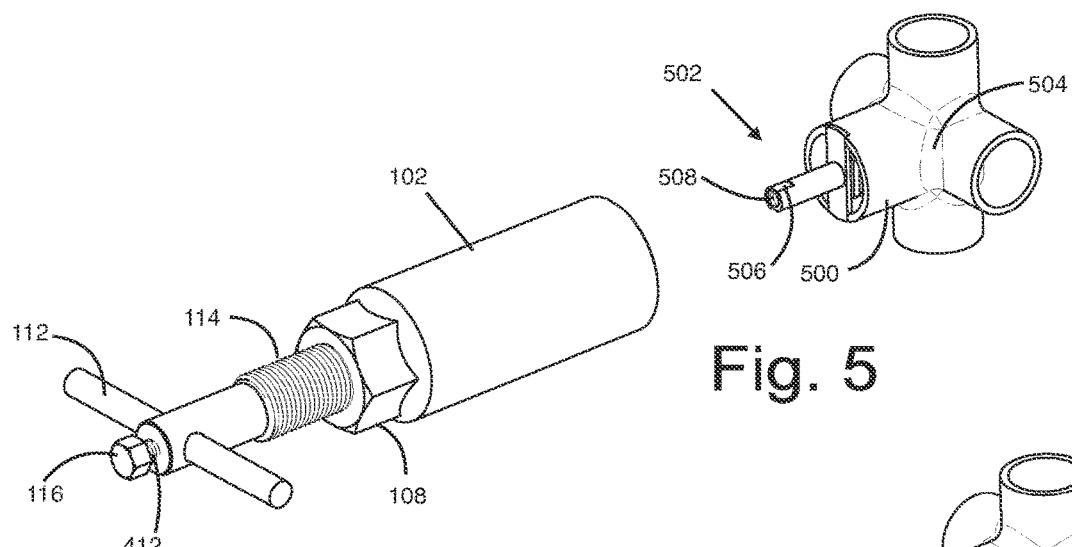
FIG. 5 illustrates a side perspective view of the faucet cartridge removal tool about to be applied to remove the faucet cartridge, in accordance with an exemplary embodiment.

As FIG. 5 shows, the extractor rod 400 defines an elongated, cylindrical shape that is sized and dimensioned to threadably fit inside the threaded interior surface 302 of the extractor rod 400. The extractor rod 400 has a threaded exterior surface 114 configured to thread through the threaded orifice 300 of the cylindrical sleeve 102. The threaded exterior surface 114 of the extractor rod 400 may include a simple screw thread that is rotatable in a first direction, i.e., right, for advancing the extractor rod 400 towards the distal end of the cylindrical sleeve 102. Conversely, the threaded exterior surface 114 of the extractor rod 400 may be rotatable in a second direction, i.e., left, for withdrawing the extractor rod 400 from the distal end of the cylindrical sleeve 102. For such axial displacement inside the cylindrical sleeve 102, the tubular extractor rod 400 has a lesser diameter than the cylindrical sleeve 102.

Figure 6:
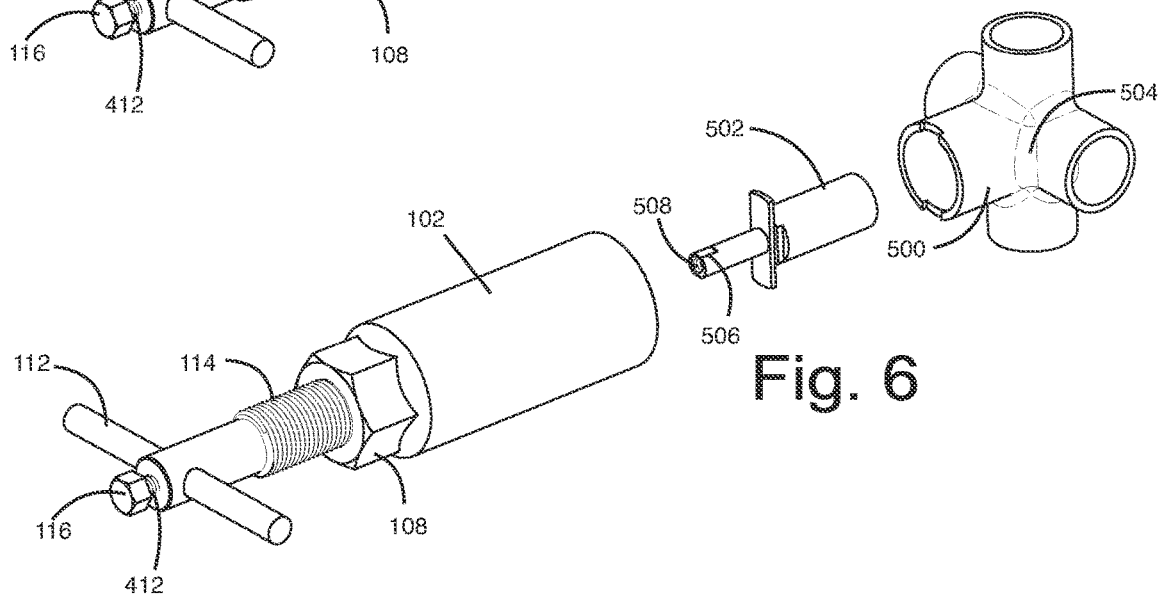
FIG. 6 illustrates a side perspective view of the faucet cartridge removal tool after it has been applied and removed the faucet cartridge, in accordance with an exemplary embodiment.

As referenced in FIG. 6, the extractor rod 400 defines a bore 406 that forms at the proximal end 404a. The bore 406 may have a cylindrical cross-sectional shape to enable passage of a cross bar 112 that fits securely within the bore 406. In one embodiment, the cross bar 112 also defines an elongated cylindrical shape, which enables passage through the correlating cylindrical shape of the bore 406. In some embodiments, the cross bar 112, and thereby the cross bar 112 are arranged perpendicular to the longitudinal axis 408 of the rod 400 (see FIG. 7). This perpendicular relationship allows a normal force to be applied to the cross bar 112 in both directions in order to rotate the extractor rod 400 for advancement or withdrawal into the pipe 500.

Looking back at FIG. 4, the extractor rod 400 forms a threaded interior surface 302 at the distal end 404b. The threaded interior surface 302 is configured to enable a locking bolt 410, discussed below, to thread into and out of the threaded interior surface 302 of the extractor rod 400. The locking bolt 410 extends in an axial relationship through the extractor rod 400, similar to the axial relationship between the extractor rod 400 and the cylindrical sleeve 102.

For this purpose, the locking bolt 410 has a lesser diameter than the tubular extractor rod 400. And in relation to the threaded interior surface 302 of the extractor rod 400, the locking bolt 410 has a threaded exterior surface 412 that serves to threadably engage the threaded interior surface 302 of the extractor rod 400. In some embodiments, this threaded relationship may be at the distal end 404b of the rod 400.

Figure 8:
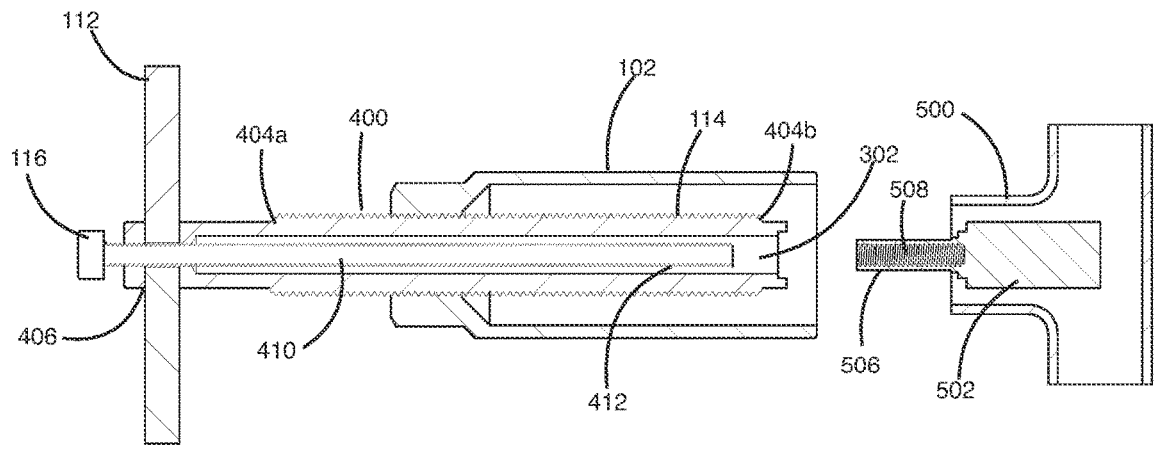
FIG. 8 illustrates a side cross-sectional view of the faucet cartridge removal tool about to be applied to remove the faucet cartridge, in accordance with an exemplary embodiment.

As illustrated in FIG. 8, the threaded interior surface 302 of the extractor rod 400 is a simple screw thread that enables the locking bolt 410 to rotate in a first direction, i.e., right, for advancing towards the distal end 404b of the extractor rod 400, and subsequently, the proximal end 506 of the faucet cartridge 502. Conversely, the threaded interior surface 302 of the extractor rod 400 enables the locking bolt 410 to rotate in a second direction, i.e., left, for withdrawing the locking bolt 410 away from the distal end 404b of the extractor rod 400. For such axial relative displacement, the locking bolt 410 has a lesser diameter than the extractor rod 400. Suitable materials for the extractor rod 400 and the locking bolt 410 may include, without limitation, carbon steel, high-speed steel, cast alloys, tungsten carbide, aluminum, and metal alloys.

In some embodiments, the locking bolt 410 defines a proximal end 118 and a distal end 402. The proximal end 118 of the locking bolt 410 has integrally joined thereto, a nut 116, which can be turned with a wrench or similar tool, to thread the locking bolt 410 through the extractor rod 400. For example, as FIG. 9 shows, the locking bolt 410 rotating in a first direction to advance through the extractor rod 400, and towards the faucet cartridge 502.

Figure 10:
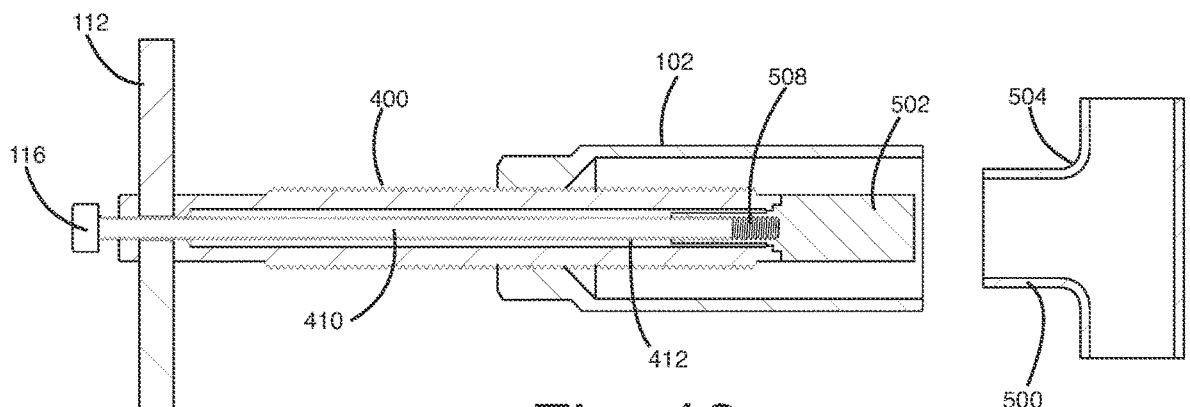
FIG. 10 illustrates a side cross-sectional view of the faucet cartridge removal tool after it has been applied and removed the faucet cartridge, in accordance with an exemplary embodiment.

In one possible embodiment, the distal end 402 of the locking bolt 410 includes a threaded exterior surface 412, which can be a simple screw thread configuration. At this distal end 402, the threaded exterior surface 412 of the locking bolt 410 threads through a threaded orifice 508 in the proximal end 506 of the faucet cartridge 502. Once the threaded orifice 508 of the faucet cartridge 502 is engaged in this manner, the nut 116 at the proximal end 118 of the locking bolt 410 can be rotated in the second direction to withdrawal the faucet cartridge 502 from the pipe 500 (FIG. 10). Conversely, the nut 116 can be rotated in the first direction to advance the faucet cartridge 502 into the pipe 500.

Figure 9:
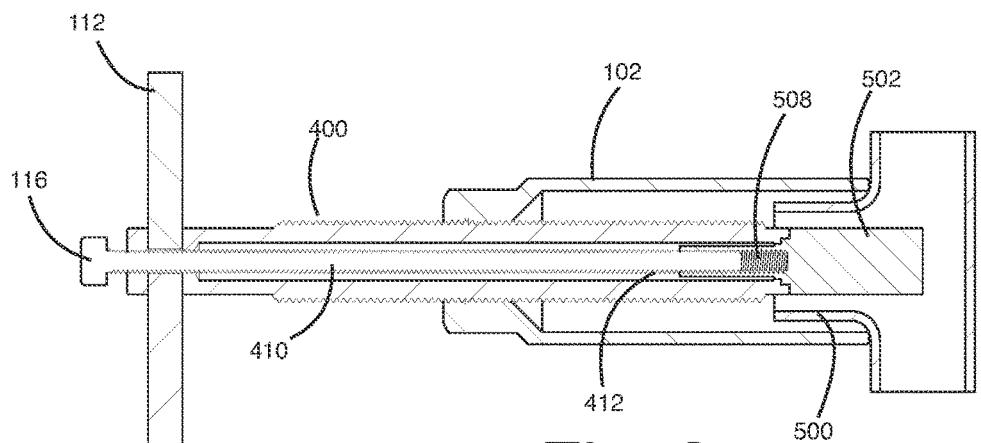
FIG. 9 illustrates a side cross-sectional view of the faucet cartridge removal tool applied to the valve to remove the faucet cartridge, in accordance with an exemplary embodiment.

As illustrated in FIG. 9, the interior volume of the cylindrical sleeve 102 is sized and shaped such that the entire section of the pipe 500 that emanates from the T-junction is located entirely within, and completely surrounded by, the cylindrical sleeve. Note also that distal end 106a of the cylindrical sleeve is contacting, touching or abutting the base 504 of pipe 500, which provides the tool 100 with a surface from which to push, as described in more detail below.

Figure 11:
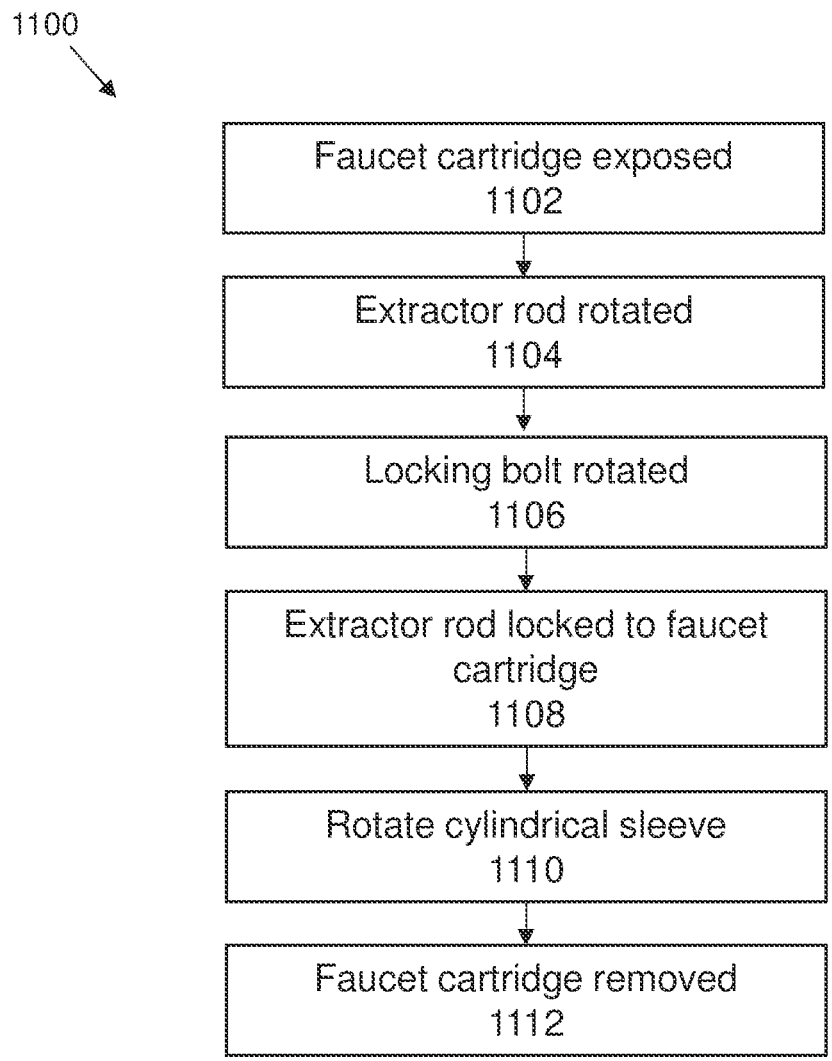
FIG. 11 illustrates a flowchart of an exemplary method for operating a faucet cartridge removal tool, in accordance with an exemplary embodiment.

Operation of the tool 100 is sequentially illustrated in FIGS. 8-10. Also, FIG. 11 illustrates a flowchart diagram of an exemplary method 1100 for operating a faucet cartridge removal tool 100. In a first step 1102, the faucet handle and the escutcheon (i.e., the cover plate) is removed to expose the valve body and gain access to the pipe 500, where the faucet cartridge 502 resides. Also, any decorative sleeve is removed from the valve body and any locking clip is removed.

In step 1104, the extractor rod 400 is rotated to the right until the distal end 404b extends ½ inch out of the cylindrical sleeve 102. That is, the distal end 404b extends ½ inch past, and out of the interior volume of the cylindrical sleeve 102. The extractor rod may be rotated using the user's hands.

In step 1106, the locking bolt 410 is rotated to the left until it extends ½ inch out of the proximal end 404a of the extractor rod 400. That is, the locking bolt 410 extends ½ inch past, and out of the interior volume of the extractor rod 400. The locking bolt may be rotated using the user's hands.

In step 1108, the distal end 404b of the extractor rod 400 is placed on to the stem or the proximal end 506 of the faucet cartridge 502 to be removed. The notch 304 at the terminus of the distal end 404b mates with the proximal end 506 of the faucet cartridge 502. Once fully aligned in this manner, then the locking bolt 410 is rotated to the right until it has been threaded into the threaded orifice 508 of the faucet cartridge 502, thereby locking the locking bolt to the cartridge, and thereby locking the extractor rod in place. The locking bolt 410 may be rotated to the right using a tool, such as an adjustable crescent wrench, on the hexagonal structure 116 of the bolt.

In step 1110, while preventing the extractor rod 400 from rotating by holding the cross bar 112 (such as with the user's hands) and preventing it from rotating, the cylindrical sleeve 102 is rotated to the right until it makes contact with the valve body where the screws for the escutcheon plate connect. In this step, the distal end 106a of the cylindrical sleeve is contacting, touching or abutting the base 504 of pipe 500, which provides the tool 100 with a surface from which to push.

In step 1112, while preventing the extractor rod 400 from rotating by holding the cross bar 112 and preventing it from rotating, the cylindrical sleeve 102 is rotated to the right until the faucet cartridge is removed or is extracted outwards such that it is no longer within the valve, and such that it is located completely within the interior volume of the cylindrical sleeve, as shown in FIG. 10. The cylindrical sleeve may be rotated using a wrench applied to the hexagonal shape on its proximal end. The extractor rod 400 is not rotated until the cartridge has been extracted at least ½ inch from the valve body.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the claimed embodiments will be further understood and appreciated by those skilled in the art by reference to the following written specification, claims and appended drawings.

Because many modifications, variations, and changes in detail can be made to the described preferred embodiments described herein, it is intended that all matters in the foregoing description and shown in the accompanying drawings be interpreted as illustrative and not in a limiting sense. Thus, the scope of the claimed embodiments should be determined by the appended claims and their legal equivalence.

Embodiments herein, for example, are described above with reference to block diagrams and/or operational illustrations of methods and systems, according to said embodiments. The functions/acts noted in the blocks may occur out of the order as described. For example, two steps described in succession may in fact be executed substantially concurrently or the steps may sometimes be executed in the reverse order, depending upon the functionality/acts involved.

While certain embodiments have been described, other embodiments may exist. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A faucet cartridge removal tool comprised of:
(a) a cylindrical sleeve having:
1) an interior diameter configured such that a pipe holding a faucet cartridge fits within the cylindrical sleeve;
2) a length configured such that a distal end of the cylindrical sleeve contacts a base of the pipe holding the faucet cartridge;
3) a hexagonal shape at a proximal end; and
4) a threaded orifice at the proximal end;

(b) a tubular extractor rod that extends through the cylindrical sleeve, wherein the tubular extractor rod is rotatable within the cylindrical sleeve, the rod having:
1) a threaded exterior surface configured to thread through the threaded orifice of the cylindrical sleeve;
2) a bore at a proximal end of the rod, the bore arranged perpendicular to a longitudinal axis of the rod;
3) a threaded interior surface of the rod at a distal end of the rod; and
4) a notch at the distal end of the rod, the notch configured to accept a proximal end of the faucet cartridge, the notch comprising a pair of opposing ridged flanges with a depression between said pair of opposing ridged flanges;
(c) a locking bolt that extends through the extractor rod, wherein the locking bolt is rotatable within the extractor rod, the locking bolt having:
1) a threaded exterior surface configured to thread through the threaded interior surface of the rod at the distal end of the rod, wherein the threaded exterior surface at a distal end of the locking bolt is configured to thread through a threaded orifice in the proximal end of the faucet cartridge; and
(d) a cross bar that fits securely within the bore at the proximal end of the rod.

2. The faucet cartridge removal tool of claim 1, wherein the cylindrical sleeve has a length of about 4½ inches.

3. The faucet cartridge removal tool of claim 2, wherein the extractor rod has a length of about 6¾ inches.

4. The faucet cartridge removal tool of claim 1, wherein the threaded exterior surface is configured to thread through the hexagonal shape at the proximal end of the cylindrical sleeve.

5. The faucet cartridge removal tool of claim 1, wherein the notch is defined by a pair of ridged flanges.

6. The faucet cartridge removal tool of claim 1, wherein the cross bar is arranged perpendicular to the longitudinal axis of the rod.

7. The faucet cartridge removal tool of claim 1, wherein the cross bar defines an elongated cylindrical shape.

8. The faucet cartridge removal tool of claim 1, wherein the locking bolt defines an elongated cylindrical shape.

9. The faucet cartridge removal tool of claim 1, wherein the cylindrical sleeve has a greater diameter than the tubular extractor rod.

10. The faucet cartridge removal tool of claim 9, wherein the tubular extractor rod has a greater diameter than the cross bar.

11. The faucet cartridge removal tool of claim 1, wherein the faucet cartridge removal tool is fabricated from at least one of the following: carbon steel, high-speed steel, cast alloys, tungsten carbide, aluminum, and metal alloys.

12. The faucet cartridge removal tool of claim 1, wherein the tubular extractor rod is configured to rotate to the right to advance towards the distal end of the cylindrical sleeve.

13. The faucet cartridge removal tool of claim 12, wherein the locking bolt is configured to rotate to the right to advance towards the distal end of the tubular extractor rod.

14. A faucet cartridge removal tool comprised of:
(a) a cylindrical sleeve having:
1) an interior diameter configured such that a pipe holding a faucet cartridge fits within the cylindrical sleeve;
2) a length configured such that a distal end of the cylindrical sleeve contacts a base of the pipe holding the faucet cartridge;
3) a hexagonal shape at a proximal end; and
4) a threaded orifice at the proximal end;
(b) a tubular extractor rod that extends through the cylindrical sleeve, wherein the tubular extractor rod is rotatable within the cylindrical sleeve, the rod having:
1) a threaded exterior surface configured to thread through the threaded orifice of the cylindrical sleeve;
2) a bore at a proximal end of the rod, the bore arranged perpendicular to a longitudinal axis of the rod;
3) a threaded interior surface of the rod at a distal end of the rod; and
4) a notch at the distal end of the rod, the notch configured to accept a proximal end of the faucet cartridge, the notch being defined by a pair of opposing ridged flanges with a depression between said pair of opposing ridged flanges, whereby the tubular extractor rod is configured to rotate to the right to advance towards the distal end of the cylindrical sleeve;
(c) an elongated cylindrically-shaped locking bolt that extends through the extractor rod, wherein the locking bolt is rotatable within the extractor rod, the locking bolt having:
1) a threaded exterior surface configured to thread through the threaded interior surface of the rod at the distal end of the rod, wherein the threaded exterior surface at a distal end of the locking bolt is configured to thread through a threaded orifice in the proximal end of the faucet cartridge, whereby the locking bolt is configured to rotate to the right to advance towards the distal end of the tubular extractor rod; and
(d) a cross bar that fits securely within the bore at the proximal end of the rod.

15. The faucet cartridge removal tool of claim 14, wherein the cylindrical sleeve has a length of about 4½ inches.

16. The faucet cartridge removal tool of claim 15, wherein the extractor rod has a length of about 6¾ inches.

17. The faucet cartridge removal tool of claim 14, wherein the threaded exterior surface is configured to thread through the hexagonal shape at the proximal end of the cylindrical sleeve.

18. The faucet cartridge removal tool of claim 14, wherein the cross bar is arranged perpendicular to the longitudinal axis of the rod.

19. The faucet cartridge removal tool of claim 14, wherein the cylindrical sleeve has a greater diameter than the tubular extractor rod, and the tubular extractor rod has a greater diameter than the cross bar.

* * * * *